3,170,889
POLYOLEFIN COMPOSITION
Archibald Miller Hyson, Wilmington, Del., assignor to
E. I. du Pont de Nemours and Company, Wilmington,
Del., a corporation of Delaware
No Drawing. Filed Mar. 9, 1959, Ser. No. 797,870
3 Claims. (Cl. 260—32.6)

This invention relates to a plastic composition of matter, and more particularly to a polyolefin composition and articles made therefrom having improved properties with respect to blocking and coefficient of friction.

It has been known for some time that one of the major drawbacks of thin films of polyethylene is a high film-to-film coefficient of friction, which often prevents the feeding of single sheets to automatic packaging equipment. Another disadvantage of thin polyethylene per se is the tendency for these films to block. Blocking is the adherence of two or more film surfaces to each other while standing under pressure. In the manufacture of blown films of polyethylene by tube blowing film, for example, this blocking phenomenon manifests itself in the adherence of the inner surfaces of the polyethylene tube to each other, making it difficult if not impossible to open the tube. Slip agents have been added to polyethylene and have markedly enhanced slipping characteristics due principally to exudation of such agents to the surface of the plastic. Excessive exudation produced by some slip agents, however, has been disadvantageous.

An object of this invention is to provide a plastic composition based on normally solid polyolefin which possesses markedly improved film-to-film coefficient of friction. Another object is to provide a polyolefin composition which upon conversion into sheets and films possesses greatly improved resistance to blocking. A further object is to provide an improved polyethylene composition with respect to blocking and coefficient of friction without significantly affecting other properties of films made therefrom such as transparency, haze, vapor permeability, and the like. Other objects will be apparent from the description of the invention given below.

This invention provides a plastic composition of a normally solid polyolefin and a small amount of a slip agent, comprising a dicarboxylic ester amide or a mono-N-alkyl- or di-N-alkyl-substituted dicarboxylic acid diamide, having the following chemical formulas—

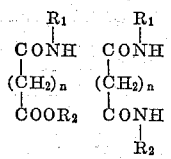

in which $R_1$ and $R_2$ are hydrogen or alkyl or fluoralkyl groups and may be similar or dissimilar, either the $R_1$ or $R_2$ group is an alkyl and contains from 6 to 20 carbon atoms and $n$ is an integer between 2 and 10. Specific embodiments of such slip agents are: n-octyl amide azelate; N,N'-dioctyl azelaic diamide; n-octadecyl amido azelate; n-nonyl amido azelate; 2-ethyl hexyl amido azelate; N-octyl N'-methyl azelaic acid diamide; and corresponding derivatives of succinic, glutaric, adipic and pimelic, suberic, azelaic, sebacic, nonendicarboxylic, decamethylenic, brassylic, dodecamethylenic acid, etc.

Compatibility of the slip agent in the polyolefin determines, in large measure, the amount of the agent that migrates to the surface of the polyolefin. A high degree of compatibility decreases the amount of migration, a low degree of compatibility increases the amount of migration. It has been found that the slip agents can be tailored for the particular operation in which the polyolefin is to be used by increasing or decreasing compatibility. This is effected by increasing or decreasing the number of carbon atoms of the alkyl substituent attached, either via an ester linkage or an amide linkage, to the mono amido or di-amido dicarboxylic acid, for it has been found that as the number of the carbon atoms in the alkyl groups increases, the compatibility increases while the exudation decreases. The reverse is also true. Inasmuch as some of the amido compounds inherently have a greater coefficient of slip than others, the contribution to slip of the acid and the alkyl group selected should also be considered. For some purposes it is frequently advantageous to extrude polyethylene into a film that has the prescribed slip coefficient immediately after the extrusion while, for other purposes, the prescribed slip is not desired until some later time. By proper attention to compatibility of the slip agent of the invention, a film having the desired coefficient of slip for the particular purpose can be produced.

The composition may be prepared by any method suitable for insuring a uniform mixture of polyolefin and additive in the final fabricated article. Suitable methods include addition of the slip agent of the invention as a solid, in solution, or in the form of a slurry in water or other non-solvent, to the polyolefin in either the dry fluff or molding powder form followed by drying and tumbling. The slip agent may also be incorporated in the polyolefin by melt blending the ingredients in conventional apparatus, such as a Banbury mixer, heated rolls, or a plasticator. A concentrate of the slip agent in polyolefin can be made by one of the aforesaid methods and this in turn can be blended with polyethylene molding powder by tumbling or other suitable means. Finally, various combinations of the above methods can be used.

In general, the proportion of the slip agent used in polyolefin to achieve any significant reduction in the coefficient of friction should be at least 0.01% by weight of the polyolefin. Increasing amounts of the slip agent will generally further reduce the film-to-film coefficient of friction. Usually there will be no particular advantage of employing amounts greater than 0.5% of slip agent by weight of the polyolefin, the amount of slip agent being governed, of course, by the slip coefficient of the particular slip agent used, and by compatibility. It is preferred to use between 0.02% and 0.075%. Between 0.0005 and about 5% slip agent by weight of the polyolefin is operable.

The chief advantage of the polyolefin compositions containing the slip agents of this invention is the fact that these compositions allow the production of transparent resin films, tubes, and other shaped articles having a predetermined film-to-film coefficient of friction. Another advantage is achieved in employing the slip agent of the invention in polyolefins to produce a composition which exhibits not only reduced film-to-film coefficient of friction and reduced tendency toward blocking, but also exhibits improved anti-static qualities and stability without significantly altering the film draw rate, transparency, haze, vapor permeability, and heat sealability of polyethylene.

Although the compositions of this invention are composed essentially of polyethylene containing small amounts of the slip agent, the compositions may also contain small amounts of other desirable additives, such as high melting waxes, antioxidants for the polymer, dyes and pigments for coloring the fabricated product, lubricants, antistatic agents, and the like, provided the additional ingredients are not present in amounts sufficient to alter the efficacy of the slip agent.

The polyolefin constituents of the plastic composition of the invention include the conventional, narmally solid branched chain polyethylenes, the linear polyethylenes, such as are prepared by any suitable process, e.g., by the processes of Larchar and Pease U.S. Patent 2,816,883, issued December 17, 1957; and the Pease and Roedel U.S. Patent 2,762,791, issued September 11, 1956; and the polyolefins of the alkenes of higher molecular weight than ethylene, such as the propenes, butenes, pentenes, etc. The slip agents herein disclosed and equivalents thereof likewise markedly improve the slippage of copolymers of the olefins or copolymers of the above olefins with other polymerizable compounds.

It has been found, moreover, that the addition of the slip agents of the invention to normally solid polyolefins is effective in markedly reducing the film-to-film coefficient of friction of such polymers, regardless of the molecular weight or crystallinity of the particular polymer.

The polyethylene compositions of this invention are particularly useful for fabrication by extrusion into thin films, sheets, blown tubing, and the like. The compositions may also be cast, extruded or molded into films, sheets, rods, tubes and piping, filaments, and other shaped articles. The compositions may also be used for coating paper, cloth, wire, metal foil, glass fiber mats, synthetic and natural textiles and other substrates.

The following example illustrates specific embodiments of this invention. All parts are given by weight unless otherwise specified.

EXAMPLE

A. Synthesis

Azelaic acid was converted to a polymeric anhydride by treatment with acetic anhydride and distillation of acetic acid according to known procedures for converting dibasic acids to their anhydrides. The anhydride of azelaic acid was heated with n-octyl alcohol at 150–160° C. for 3½ hours. The resulting n-octyl hydrogen azelate was purified by solution in petroleum ether followed by filtration to remove precipitated azelaic acid. The petroleum ether was evaporated from the filtrate and the n-octyl hydrogen azelate was further purified by treatment with dilute NaOH solution in the cold to a pH of 8.5. The alkaline solution was filtered through filter-aid to remove insolubles and the filtrate was acidified with hydrochloric acid to a pH of 3.5. The oil which separated was extracted with petroleum ether. After washing, the petroleum ether was distilled off to leave the purified n-octyl hydrogen azelate.

n-Octyl hydrogen azelate, 20.0 g., was refluxed with 25.0 g. of thionyl chloride for one hour or until evolution of HCl had ceased. The cooled reaction mixture was then passed with stirring into excess cold concentrated NH₄OH solution. The resulting solid was removed by filtration and twice recrystallized from 2B alcohol. The white, crystalline n-octyl amido azelate weighed 6.0 g. and melted at 72–74° C. By working up the mother liquors an additional 10.0 g. of less pure material was obtained. An infrared analysis of the product showed the presence of a primary amide and an ester group. The compound was found to contain 4.58% N. Theoretical for n-octyl amido azelate is 4.68%.

B. Use 500 p.p.m. of n-octyl amido azelate was incorporated into a polyethylene having a density of 0.923 and a melt index of 2.1 by milling on a rubber mill at 160° C. for 15 minutes. The resulting composition was cooled and cut to convenient size for extrusion. The composition was extruded at approximately 200° C. into 1½ mil flat film. After periods of 3 and 10 days time (from time of extrusion) the coefficient of friction of the film was measured and the amounts given in the following table in which slip agents are compared with a control containing no slip agent.

The coefficient of friction was measured on two pieces of film, 3" x 5", by moving one film over another at a constant rate under specific loadings. The resistance to sliding was measured on a spring balance and the coefficient of friction obtained by dividing the force required to move the film by the load on the film.

TABLE

| Compounds | Coefficient of Friction (3 days after extrusion) |
| --- | --- |
| 1st Extrusion: | |
| Control | 0.50 |
| Lauryl amido succinate | 0.28 |
| Decyl amido glutarate | 0.26 |
| Lauryl amido adipate | 0.27 |
| 2nd Extrusion: | |
| Control | 0.55 |
| Octyl amido azelate | 0.16 |
| 2-ethylhexyl amido azelate | 0.31 |
| 2-ethylhexyl amido succinate | 0.39 |

I claim:

1. A normally solid polyolefin composition the polyolefin constituent of which consists of alpha-mono-olefin units having 2 to 5 carbon atoms containing from 0.0005% to about 5% by weight of the polyolefin of a compound selected from the class consisting of lauryl amido succinate, octadecyl amido succinate, decyl amido glutarate, lauryl amido adipate, n-octyl amido azelate, 2-ethylhexyl amido azelate and 2-ethylhexyl amido succinate.

2. A film of the composition of claim 1.

3. A normally solid polyethylene containing 0.025% to 0.075% by weight of n-octyl amido azelate.

References Cited in the file of this patent

UNITED STATES PATENTS

| 2,502,478 | Padbury et al. | Apr. 4, 1950 |
| 2,770,609 | Symonds | Nov. 13, 1956 |
| 2,773,852 | Rowe et al. | Dec. 11, 1956 |
| 2,832,799 | Payne et al. | Apr. 29, 1958 |
| 2,938,879 | Mock et al. | May 31, 1960 |
| 2,991,263 | Clark et al. | July 4, 1961 |

FOREIGN PATENTS

| 1,132,791 | France | Nov. 5, 1956 |
| 883,502 | Germany | July 20, 1953 |
| 1,040,234 | Germany | Oct. 2, 1958 |